(12) United States Patent
Volta et al.

(10) Patent No.: US 10,449,574 B2
(45) Date of Patent: Oct. 22, 2019

(54) METHOD OF MANUALLY MERGING POSTAL ARTICLES WITH A STACK OF MAILPIECES THAT ARE ALREADY SORTED

(71) Applicant: Solystic, Bagneux (FR)

(72) Inventors: Bruno Volta, Gif sur Yvette (FR); Emmanuel Miette, Saint-Gratien (FR)

(73) Assignee: SOLYSTIC, Bagneux (FR)

( * ) Notice: Subject to any disclaimer, the term of this patent is extended or adjusted under 35 U.S.C. 154(b) by 116 days.

(21) Appl. No.: 15/116,135

(22) PCT Filed: May 26, 2016

(86) PCT No.: PCT/FR2016/051242
§ 371 (c)(1),
(2) Date: Jul. 17, 2018

(87) PCT Pub. No.: WO2016/203126
PCT Pub. Date: Dec. 22, 2016

(65) Prior Publication Data
US 2018/0326459 A1    Nov. 15, 2018

(30) Foreign Application Priority Data

Jun. 16, 2015    (FR) .................................... 15 55498

(51) Int. Cl.
*B07C 7/00*         (2006.01)
(52) U.S. Cl.
CPC ...... *B07C 7/005* (2013.01); *B07C 2301/0083* (2013.01)
(58) Field of Classification Search
CPC ... B07C 7/005; B07C 2301/0083; B07C 9/00; B07C 5/00

USPC .................................................. 209/583, 900
See application file for complete search history.

(56) References Cited

U.S. PATENT DOCUMENTS

2017/0014869 A1*   1/2017   Miette .................. H04N 5/2251

FOREIGN PATENT DOCUMENTS

| DE | 102010043389 | * | 5/2012 | ............... B07C 3/00 |
| DE | 102010043389 A1 | | 5/2012 | |
| WO | 2014087069 A1 | | 6/2014 | |

OTHER PUBLICATIONS

French Search Report dated Apr. 12, 2016, for Application No. 1555498.

* cited by examiner

*Primary Examiner* — Terrell H Matthews
(74) *Attorney, Agent, or Firm* — Patterson + Sheridan, LLP

(57) ABSTRACT

A method of merging postal articles with a stack of mailpieces that have already been machine-sorted into a delivery round comprises the following steps: inserting the postal articles in sequence into a sorting frame having slots; placing the stack of mailpieces on a merge table; displaying on a display screen of a monitoring and control unit an indication representative of a number of current postal articles to be merged, and of an insertion position at which the postal articles should be inserted into the stack of mailpieces; then manually taking from the frame the number of postal articles indicated on the screen, and inserting them into the stack to perform a current merger; and having the monitoring and control unit measure a distance before and after the current merger to detect any error in taking the postal articles from the frame.

6 Claims, 3 Drawing Sheets

METHOD OF MANUALLY MERGING POSTAL ARTICLES WITH A STACK OF MAILPIECES THAT ARE ALREADY SORTED

TECHNICAL FIELD

The invention relates to the field of postal sorting. The invention relates more particularly to a method of manually merging postal articles with mailpieces that are already machine-sorted into a certain sorting order, e.g. into the order of the delivery round or "postman's walk".

Such postal articles are, particularly but not exclusively, non-machine-sortable postal articles, i.e. postal articles that cannot currently be sorted automatically in sorting machines.

PRIOR ART

Postal sorting machines and methods used for preparing delivery rounds can be fully automatic, or else they can include steps in which it is necessary for an operator to intervene, in particular for handling non-machine-sortable postal articles.

On that subject, a method is already known from Patent WO 2014/087069 for merging a postal article with sorted mail. In that method, assistance is provided by visually designating the location at which the postal article should be inserted into the stack.

A method is also known from Patent Document DE 10 2010 043 389 for merging non-machine-sortable postal articles with machine-sorted mail. In that known method, merging assistance is given to the operator in charge of performing the merging. That operator assistance consists in displaying on a display screen placed next to the operator the image of a reference mailpiece that should precede or that should follow the postal article to be merged, in the ordered sequence of the mailpieces. For that purpose, a camera is used to take a digital image of the postal article to be merged, and said reference mailpiece is determined on the basis of the mailpiece data produced in the sorting machine during the preceding sorting passes performed on the mailpieces, and also on the basis of a sorting plan that corresponds to the ordering of said mailpieces in the sequence.

Then the operator scans through the sequence of mailpieces until said operator visually identifies the reference mailpiece, whereupon said operator can insert the postal article at the right place in the ordered sequence of the mailpieces.

This type of manual merging in preparing the delivery round is very time-consuming for the operator considering the small number of postal articles to merge, and cannot guarantee good sorting reliability.

SUMMARY OF THE INVENTION

An object of the invention is therefore to remedy those drawbacks.

The basic idea of the invention consists in accelerating preparation of the delivery round by giving the operator additional means for being assisted in the merging.

The idea consists more particularly in displaying on a display screen all of the indications necessary for the operator to take a non-machine-sortable postal article or a handful of non-machine-sortable postal articles so as to insert them into the same insertion slot in a stack of already-sorted mailpieces.

The idea also consists in proposing means for automatically monitoring the number of postal articles merged at each insertion into the stack. Not only is merging the postal articles with the stack of mailpieces accelerated, but also the risk of sorting error is reduced considerably.

To this end, the invention thus provides a method of merging postal articles with a stack of mailpieces that have already been machine-sorted into a certain sorting order, said method being characterized in that it comprises the following steps:

inserting the postal articles in sequence into a sorting frame having slots so that the postal articles are in said certain sorting order, the frame being designed to enable said postal articles to be taken manually in handfuls;

placing said stack of mailpieces on a merge table in the vicinity of said frame;

displaying an indication on a display screen of a monitoring and control unit that keeps in a memory sorting data for the sequence of postal articles and sorting data for the stack of mailpieces, which indication is representative both of an insertion position at which the postal articles should be inserted into the stack of mailpieces, and also of a number of postal articles to be taken from the frame and to be merged with said stack of mailpieces at said insertion position;

manually taking from said frame said number of postal articles indicated on the screen, and inserting said postal articles into the stack of mailpieces at said insertion position indicated on the screen; and having said monitoring and control unit measure first and second distances relative to the first postal article in the sorting frame at the head of the sequence respectively before and after said number of postal articles indicated on the screen are taken, and, on the basis of these two distance measurements, if the monitoring and control unit detects an error in the taking of the postal articles from the frame, having said unit generate an error signal.

It can thus be understood that this method is particularly suitable when a plurality of postal articles are to be merged at the same insertion position with the stack of already sorted mailpieces.

The speed of merging can thus be increased and the handling costs reduced.

Similarly, it can be understood that the error signal gives the operator the information necessary for correcting the insertion error and for guaranteeing that merging is much more reliable than with known merging methods.

The method of the invention may advantageously have the following features:

said monitoring and control unit measures said first and second distances by means of a range finder pointing to said postal article at the head of the sequence in the frame; and the monitoring and control unit displays the error signal on the screen.

The invention also provides apparatus for assisting in merging, which apparatus comprises:

a sorting frame having vertical slots for storing on edge the postal articles to be merged, the vertical slots succeeding one another between two distal ends of the frame;

a horizontal merge table that is disposed under the frame and suitable for storing a stack of mailpieces; and a monitoring and control unit with a display screen, the unit being connected to a range finder disposed facing a distal end of the frame.

The apparatus for assisting in merging may also have the following features:

the frame has separating walls for separating the slots, which walls are L-shaped; and said merge table is disposed to extend transversely to the frame.

BRIEF DESCRIPTION OF THE DRAWINGS

The present invention can be better understood and other advantages appear on reading the following description and on examining the accompanying drawings, in which.

DESCRIPTION OF AN IMPLEMENTATION

Figure 1:
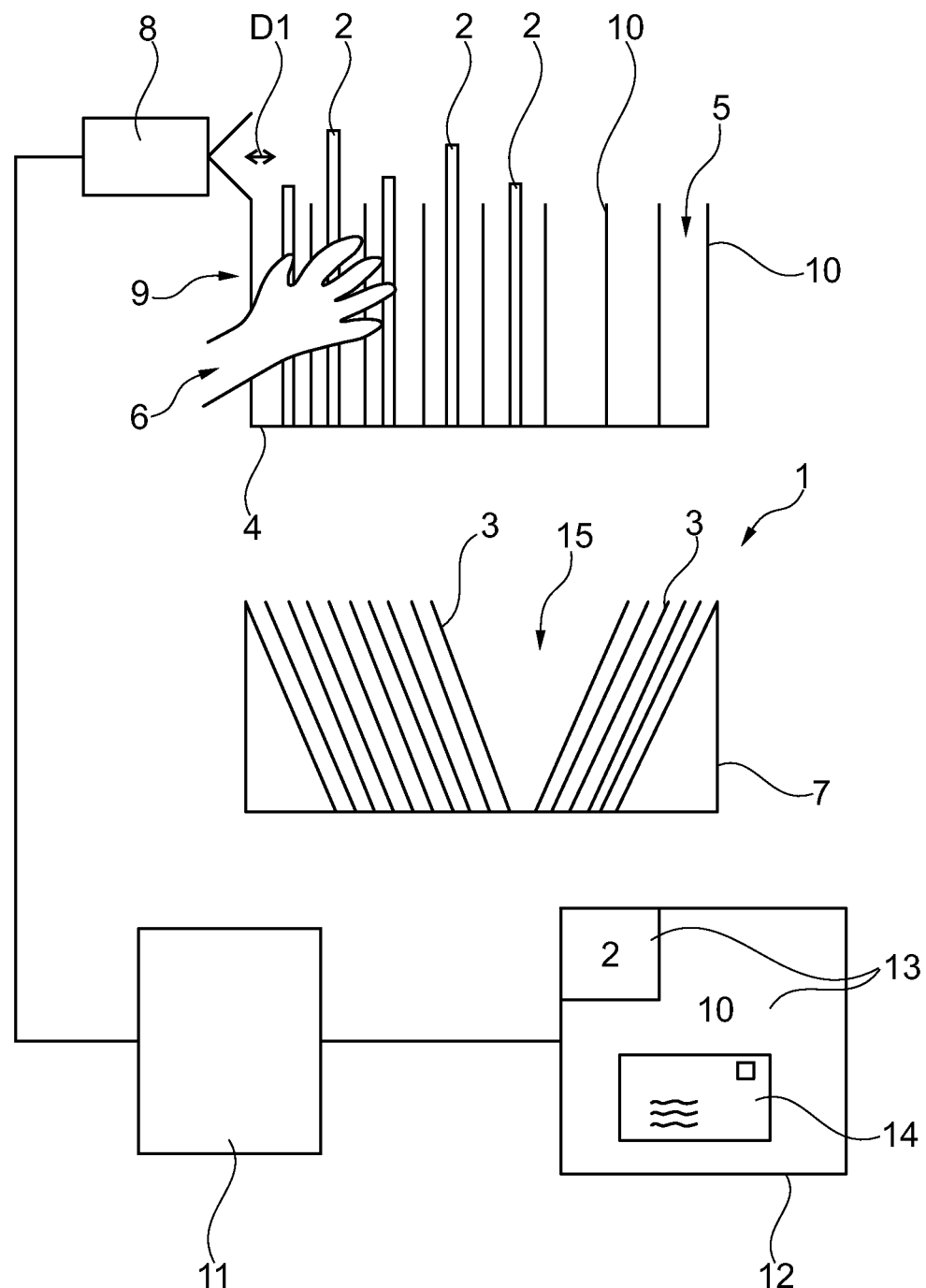
FIG. 1 is a diagrammatic view of apparatus for assisting in merging for implementing the method of merging of the invention, said apparatus being shown in a certain state before merging postal articles with mailpieces.

FIG. 1 is a highly diagrammatic view of apparatus 1 for assisting in merging postal articles 2, in particular non-machine-sortable articles, with a stack of mailpieces 3 that are already sorted into a certain sorting order, e.g. into the order of the delivery round. For example, the mailpieces 3 are letters, magazines, or other flat postal articles that are machine-sortable, i.e. that can be sorted automatically in a postal sorting machine, as is well known to the person skilled in the art.

In this example, the apparatus 1 for assisting in merging comprises a linear sorting frame or "frame" 4 having vertical slots 5, each of which is suitable for receiving one or more postal articles 2 on edge. The vertical slots 5 succeed one another in mutually parallel manner between two distal ends of the frame 4 along its long length, and the frame has separating walls 10 for separating the slots, which walls extend in planes perpendicular to the long length of the frame and that are designed to enable an operator, symbolized by a hand 6 in FIG. 1, to take handfuls of the postal articles 2 inserted in them. In the example shown in FIGS. 1 and 2, the separating walls 10 for separating the slots are L-shaped in the respective planes perpendicular to the long length of the frame so that the slots are open both over the front face and over the top face of the frame.

The apparatus 1 for assisting in merging also includes a merge table 7 that, in this example, is in the form of the bottom of a tray in which the already-sorted mailpieces 3 are disposed in a stack and on edge. FIG. 1 shows the stack of mailpieces 3 as separated into two portions on either side of a V-shaped insertion slot 15.

In accordance with the invention, to facilitate manual merging of the postal articles 2 with the mailpieces 3, the frame 4 is placed above the merge table 7 within reach of the operator 6 and of the merge table 7 (and thus of the stack of mailpieces 3 on edge) which table, in this example, extends transversely to the frame 4 (i.e. along the long length of the frame 4). Without restricting the scope of the invention, the merge table may also extend perpendicularly to the length of the frame.

The apparatus 1 for assisting in merging also includes a range finder 8 that, as shown in FIG. 1, is placed facing a distal end 9 of the frame 4, which end is the end that is in the vicinity of the postal article 3 at the head of the sequence in the frame (i.e. the postal article that is to be taken first from the frame to perform the successive operations of merging the postal articles with the mailpieces). For example, and as in this example, the range finder 8 may be pointing towards the angles of the L-shapes of the walls 10 so as to measure, every time, a relative distance relative to the current first postal article at the head of the sequence in the frame, regardless of whether that article is a small or a large postal article.

Without restricting the scope of the invention, each of the walls 10 may have an opening in the angle of the L-shape and through which the range finder 8 points. Thus, the range finder 8 can measure a distance even with postal articles 2 of very small size that do not extend beyond the edges of the L-shaped walls of the frame.

The apparatus for assisting in merging further includes a monitoring and control unit 11 suitable for keeping in a memory sorting data for the sequence of postal articles 2 to be merged and sorting data for the mailpieces 3 that have already been sorted, and, on the basis of said data, for generating indications for an operator that, for a current merging operation, are representative of a current insertion position at which postal articles from the frame should be inserted into the stack of mailpieces, and thus of a current number of postal articles to be taken from the frame starting from the head of the sequence of postal articles, and to be inserted at the current position into the stack of mailpieces.

The sorting data may be constituted by a sequenced list of points of delivery that correspond, for example, to the list of delivery addresses for the mailpieces in the stack on edge on the merge table.

Said sorting data may be produced by a conventional postal sorting machine with sorting outlets into which the mailpieces are sorted automatically, e.g. following a sorting plan for the delivery round.

For non-machine-sortable postal articles and by way of example, the sorting data may be generated from a semi-automatic system for optically recognizing the delivery addresses on the postal articles and for sequencing these automatically recognized addresses with the same sorting plan as above, and it may be generated simultaneously with the postal articles being manually sequenced in the frame.

On the basis of said sorting data, the monitoring and control unit 11 is, for example, suitable for identifying and for counting the postal articles in the sequence of postal articles per point of delivery, and, on the basis of the identification of the various points of delivery in the sequence of the postal articles, for locating among the mailpieces sorted into sequence the positions of the various insertion points for inserting the postal articles, which insertion points correspond to the points of delivery of the postal articles.

The monitoring and control unit 11 may be programmed so that, on detecting activation, e.g. by detecting a key being pressed, it displays on the screen 12 an indication 13 representative of the current number of postal articles to be taken from the frame for a current merging operation, and also representative of the current insertion position at which the postal articles should be inserted into the stack of mailpieces. In FIG. 1, the indication 13 comprises a first number, in this example the number 2 at the top left of the screen, of articles to be taken from the frame 4, and a second number, in this example the number 10 at the bottom right of the screen, which number designates that the current insertion position is positioned immediately after the 10$^{th}$ mailpiece, as counted from the head of the stack of mailpieces.

The operator can then scan through the ten mailpieces starting from the head of the stack, and, between the tenth and the eleventh mailpiece, form a V-shaped insertion slot 15 as shown in FIG. 1. The operator then takes hold of the two postal articles at the head of the sequence in the frame and inserts them into the slot 15 to perform the merging.

Then, on detecting a new key press, the monitoring and control unit 11 displays on the screen 12 a new indication 13 with a new current number of postal articles to be taken from the frame, and a new current insertion position at which to insert the postal articles in the stack of mailpieces.

Advantageously, the monitoring and control unit may be arranged so that, it also displays on the screen 12 the image of the mailpiece immediately downstream of the insertion slot 15, thereby enabling the Operator to check visually that the insertion slot 15 is in the right position in the stack.

In accordance with the invention, the monitoring and control unit 11 is programmed so that, at each merging operation, it takes two successive distance measurements using the range finder 8 so as to improve the monitoring of the merging operation, one measurement being taken before the current postal articles are merged with the stack of mailpieces, and the other measurement being taken after the current postal articles have been merged with the stack of mailpieces.

In particular, with a frame 4 and slots 5 spaced apart at constant intervals, and with postal articles distributed in the slots, with one or more postal articles per slot in the frame, the difference between the two distance measurements before and after the merging, corresponds to the number of postal articles indicated at the top left of the display screen 12.

Figure 2:
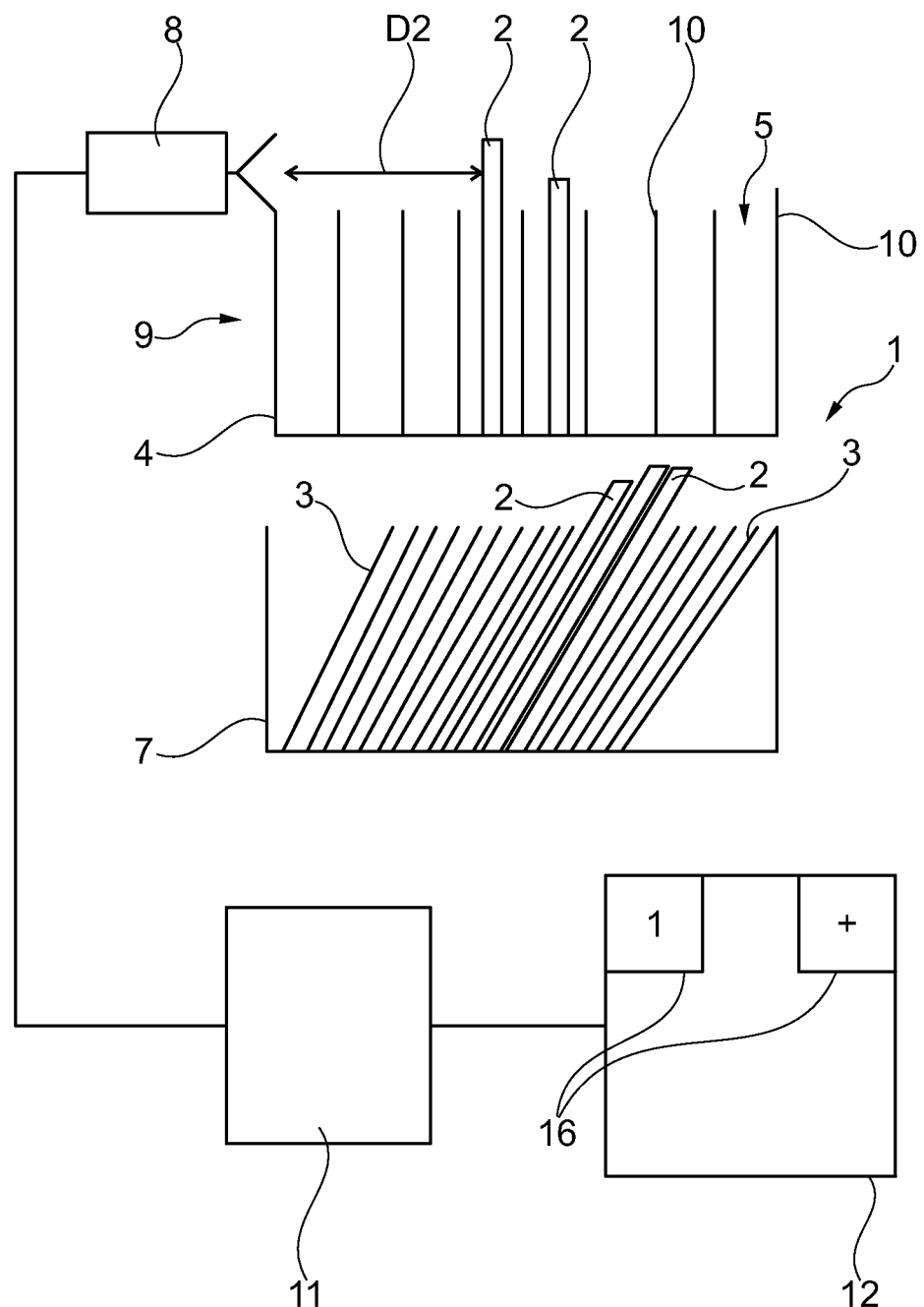
FIG. 2 is a diagrammatic view of the apparatus of FIG. 1 for assisting in merging, said apparatus being shown in a state after the postal articles have been merged with the mailpieces.

On this basis, the monitoring and control unit 11 is suitable for detecting positive or negative error in the number of postal articles actually taken from the frame each time a merging operation takes place, and for responding to a take error being detected by generating an error signal for the operator, e.g. by displaying an indication 16 shown in FIG. 2.

This indication 16 may, for example, include a plus sign (+) or a minus sign (−) displayed at the top right of the screen to indicate that too many or not enough postal articles have been merged, and a numeral displayed at the top left of the screen to indicate the number of postal articles associated with the + sign or with the − sign.

Figure 3:
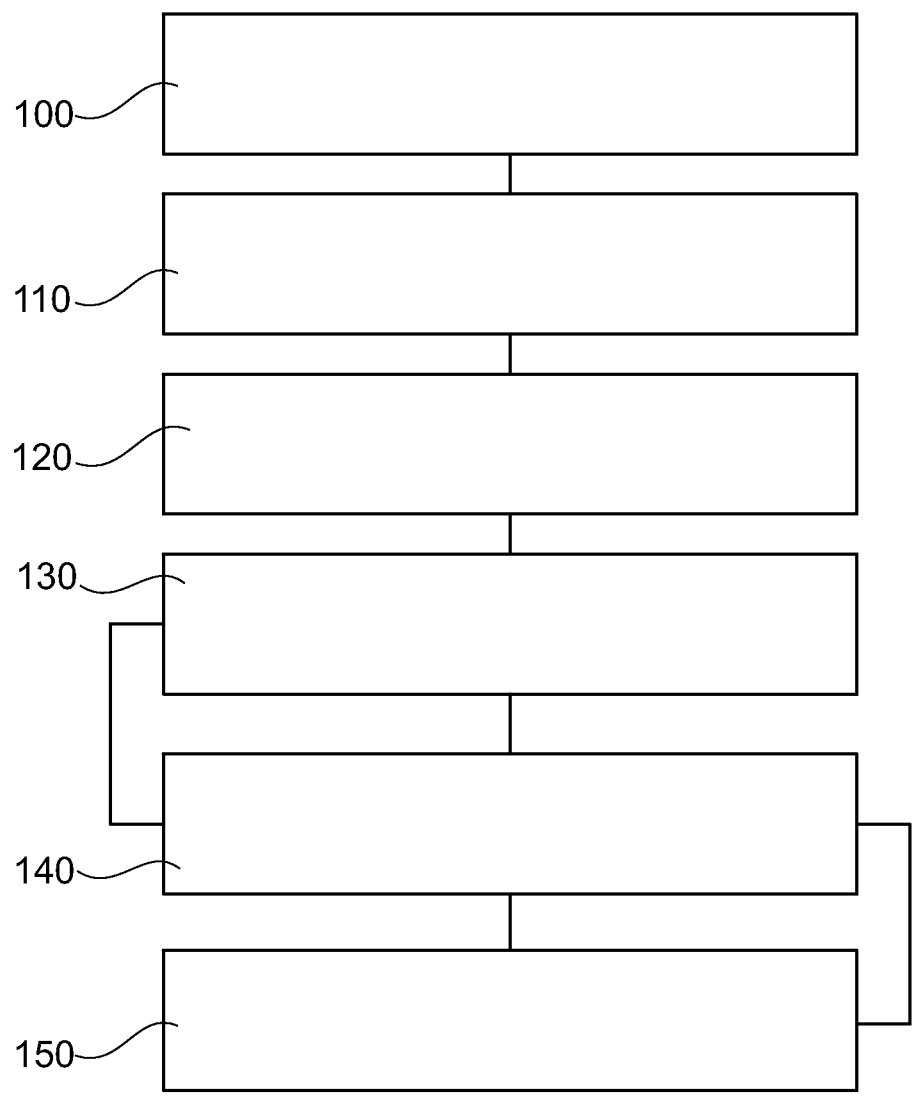
FIG. 3 is a flow chart showing the main steps of the method of the invention.

FIG. 3 shows the successive steps in a merging operation with the apparatus for assisting in merging shown in FIGS. 1 and 2.

In step 100, the operator 6 places a stack of mailpieces 3 on the merge table 7, and places a sequence of postal articles to be merged in the sorting frame 4.

In step 110, the operator activates the monitoring and control unit 11, e.g. by a key press, thereby causing a current indication 13 and optionally a monitoring image 14 to be displayed on the screen 12.

In step 110, the monitoring and control unit reads a first monitoring distance D1 (see FIG. 1) via a range finder 8 that is pointing to the current postal article at the head of the sequence in the frame.

In step 120, the operator scans through the stack of mailpieces to form an insertion slot 15 at the position indicated by the current indication 13.

In step 130, the operator takes hold of a postal article or of a handful of postal articles in the frame 4 as a function of the current indication 13 displayed on the screen 12 and inserts said postal articles into the insertion slot 15 formed in the stack of mailpieces in step 120.

The current merging operation is complete, and, in step 130, the operator activates the monitoring and control unit again by a key press.

In step 140, in response to the key press being detected, the monitoring and control unit 11 reads a second monitoring distance D2 (see FIG. 2) via the range finder 8 that is now pointing to a new current postal article at the head of the sequence in the sorting frame.

In step 150, the monitoring and control unit 11 compares the two distance measurements D1 and D2 and, if it detects that the difference between D1 and D2 does not correspond to the number of postal articles to be taken in step 130, it causes an error message such as 16 to be displayed on the screen 12.

The process then loops back to step 110 in which the monitoring and control unit 11 is waiting for a new key press to be detected.

If the monitoring and control unit 11 does not detect any take error, the process loops directly back to step 110 without waiting for a key press to be detected.

The invention claimed is:

1. A method of merging postal articles with a stack of mailpieces that have already been machine-sorted into a certain sorting order, said method being characterized in that it comprises the following steps:
    inserting the postal articles in sequence into a sorting frame having slots so that the postal articles are in said certain sorting order, the frame being designed to enable said postal articles to be taken manually in handfuls;
    placing said stack of mailpieces on a merge table in the vicinity of said frame;
    displaying an indication on a display screen of a monitoring and control unit that keeps in a memory sorting data for the sequence of postal articles and sorting data for the stack of mailpieces, which indication is representative both of an insertion position at which the postal articles should be inserted into the stack of mailpieces, and also of a number of postal articles to be taken from the frame and to be merged with said stack of mailpieces at said insertion position;
    manually taking from said frame said number of postal articles indicated on the screen, and inserting said postal articles into the stack of mailpieces at said insertion position indicated on the screen; and
    having said monitoring and control unit measure first and second distances relative to the first postal article in the sorting frame at the head of the sequence respectively before and after said number of postal articles indicated on the screen are taken, and, on the basis of these two distance measurements, if the monitoring and control unit detects an error in the taking of the postal articles from the frame, having said unit generate an error signal.

2. A method according to claim 1, characterized in that said monitoring and control unit measures said first and second distances by means of a range finder pointing to said postal article at the head of the sequence in the frame.

3. A method according to claim 1, characterized in that the monitoring and control unit displays the error signal on the screen.

4. Apparatus for assisting in merging for implementing the method according to claim 1, said apparatus being characterized in that it comprises:
- a sorting frame having vertical slots for storing on edge the postal articles to be merged, the vertical slots succeeding one another between two distal ends of the frame;
- a horizontal merge table that is disposed under the frame and suitable for storing a stack of mailpieces; and
- a monitoring and control unit with a display screen, the unit being connected to a range finder disposed facing a distal end of the frame.

5. Apparatus according to claim 4, characterized in that the frame has separating walls for separating the slots, which walls are L-shaped.

6. Apparatus according to claim 4, characterized in that said merge table is disposed to extend transversely to the frame.

* * * * *